United States Patent [19]

Horewitch

[11] Patent Number: 4,899,722
[45] Date of Patent: Feb. 13, 1990

[54] BURNER ASSEMBLY FOR HEATING CHAFING DISHES

[76] Inventor: Richard L. Horewitch, 2063 22nd Ave., San Francisco, Calif. 94116

[21] Appl. No.: 240,750

[22] Filed: Sep. 2, 1988

[51] Int. Cl.$^4$ ............................................. F24C 3/02
[52] U.S. Cl. .............................. 126/39 H; 126/261; 126/39 E; 126/39 B; 126/50; 431/344
[58] Field of Search ................. 126/39 E, 39 H, 39 R, 126/39 B, 240, 44, 43, 45, 50, 281, 282, 271.3, 249, 38, 261; 431/354, 344, 321

[56] References Cited

U.S. PATENT DOCUMENTS

| | | | |
|---|---|---|---|
| 196,120 | 10/1877 | Hull | 126/50 |
| 725,335 | 4/1903 | Glaessner | 126/43 |
| 1,026,978 | 5/1912 | Fenton | 126/282 |
| 1,453,519 | 5/1923 | Rawls | 126/43 |
| 1,587,157 | 6/1926 | Hull | 126/38 |
| 2,585,648 | 11/1948 | Greenfield | 431/321 |
| 2,590,418 | 3/1952 | Kobler et al. | 126/261 |
| 3,361,126 | 1/1968 | Bloomfield | 126/261 |
| 3,648,680 | 3/1972 | Hein | 126/38 |
| 3,809,054 | 5/1974 | Bowman et al. | 126/38 |
| 3,877,458 | 4/1975 | Allander | 126/44 |
| 3,884,256 | 5/1975 | Corlet | 137/322 |
| 3,895,622 | 7/1975 | Krueger | 126/38 |
| 3,933,146 | 1/1976 | Hastings | 126/38 |
| 3,978,844 | 9/1976 | Wilkens | 126/38 |
| 4,122,764 | 10/1978 | D'Ambra | 126/38 |
| 4,177,790 | 12/1979 | Zenzaburo | 126/38 |
| 4,726,350 | 2/1988 | Steinhauser | 126/38 |
| 4,759,276 | 7/1988 | Segroves | 126/39 R |

FOREIGN PATENT DOCUMENTS

| | | | |
|---|---|---|---|
| 398597 | 6/1909 | France | 126/45 |
| 1507838 | 4/1978 | United Kingdom | 126/39 R |

Primary Examiner—James C. Yeung
Attorney, Agent, or Firm—Flehr, Hohbach, Test, Albritton & Herbert

[57] ABSTRACT

A burner assembly for use with a chafing dish having a leg structure for support of a chafing dish above a support surface. The burner assembly includes a butane fuel source or reservoir, a burner head connected to the fuel source, a valve mounted between the fuel source and the burner head to control the flow of butane to the burner head, and burner head support structure supporting the burner head above the support surface. The burner support structure further includes a base having a portion formed for positioning proximate and outwardly of the leg structure of the chafing dish, and an arm portion which is preferably cantilevered relative to the base portion. The arm extends from a position outwardly of the chafing dish leg structure to a position between the chafing dish heater support tray and the bottom of the chafing dish to enable heating of the chafing dish. The base is formed for support of the arm portion and burner head for movement independently of the chafing dish. The burner assembly is also preferably self-supporting independent of the chafing dish and yet cannot support a cooking utensil directly on the burner. The fuel reservoir of the burner assembly is coupled to the burner head by a conduit of sufficient length to position the fuel source beside, not under, the chafing dish.

9 Claims, 4 Drawing Sheets

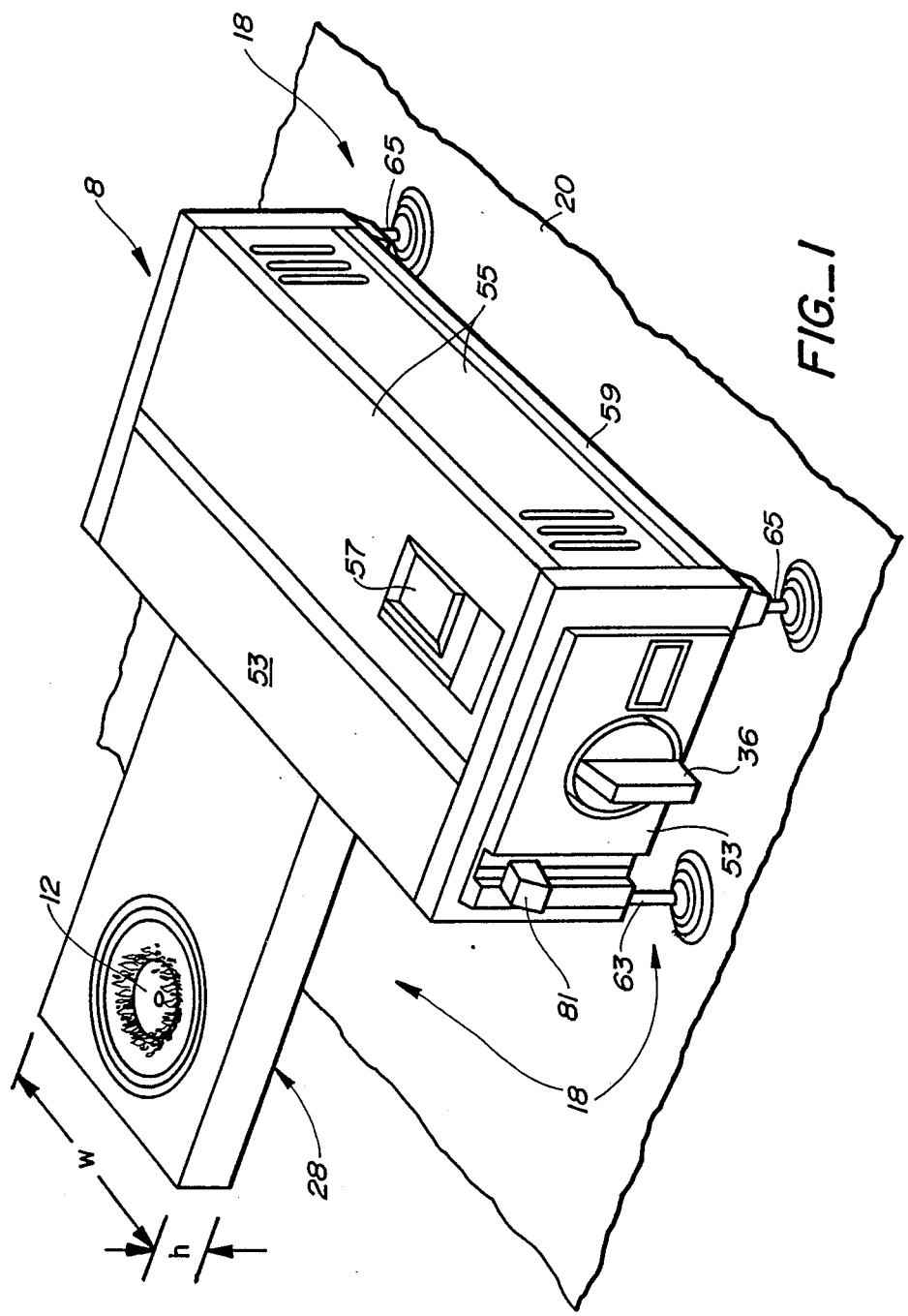
FIG._1

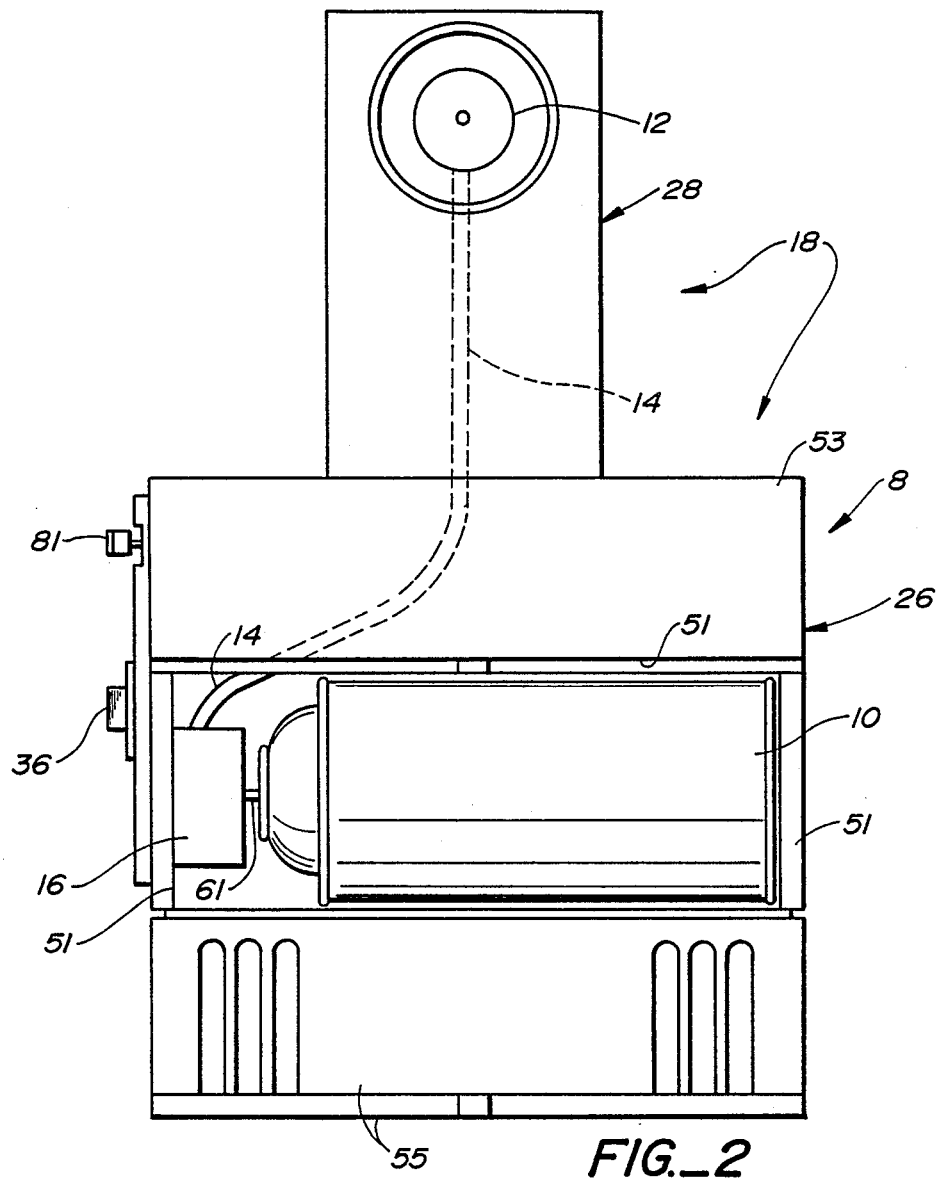
FIG._2

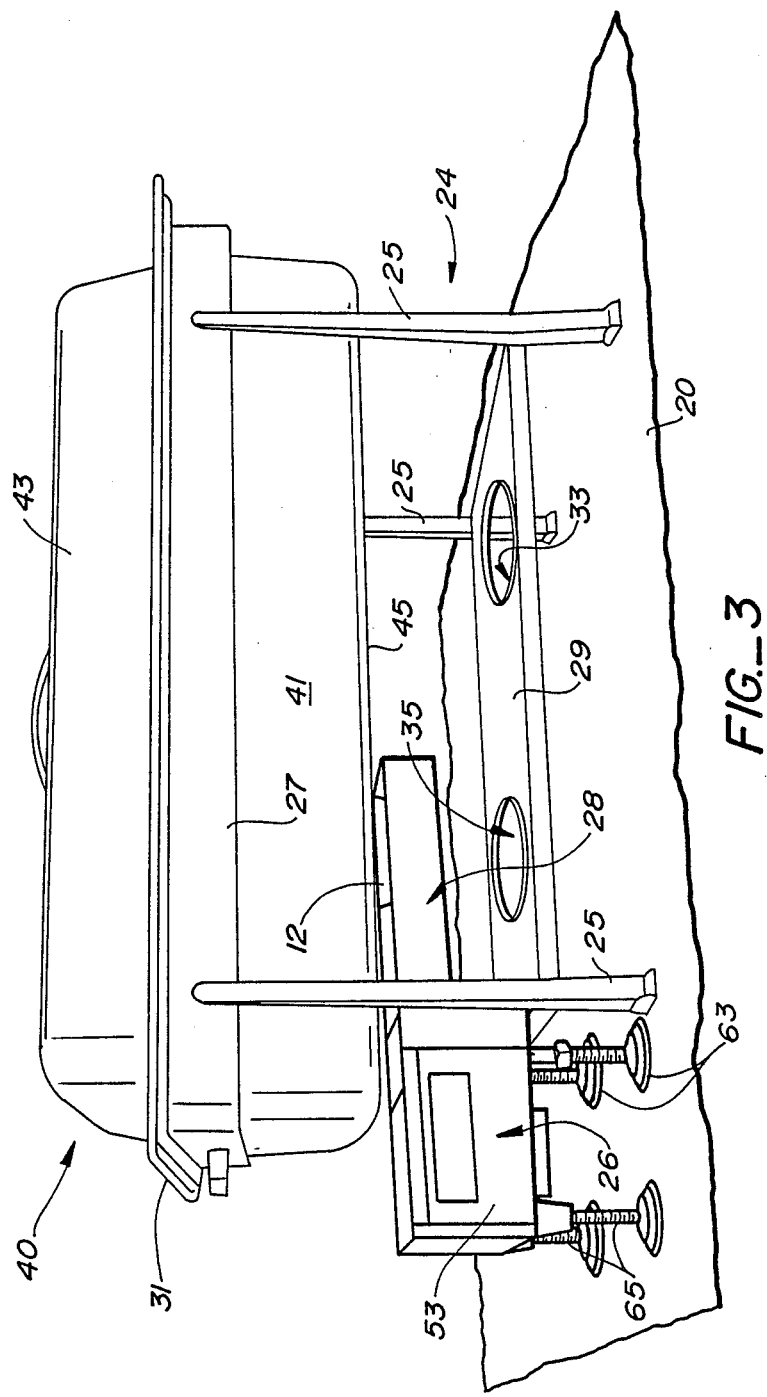

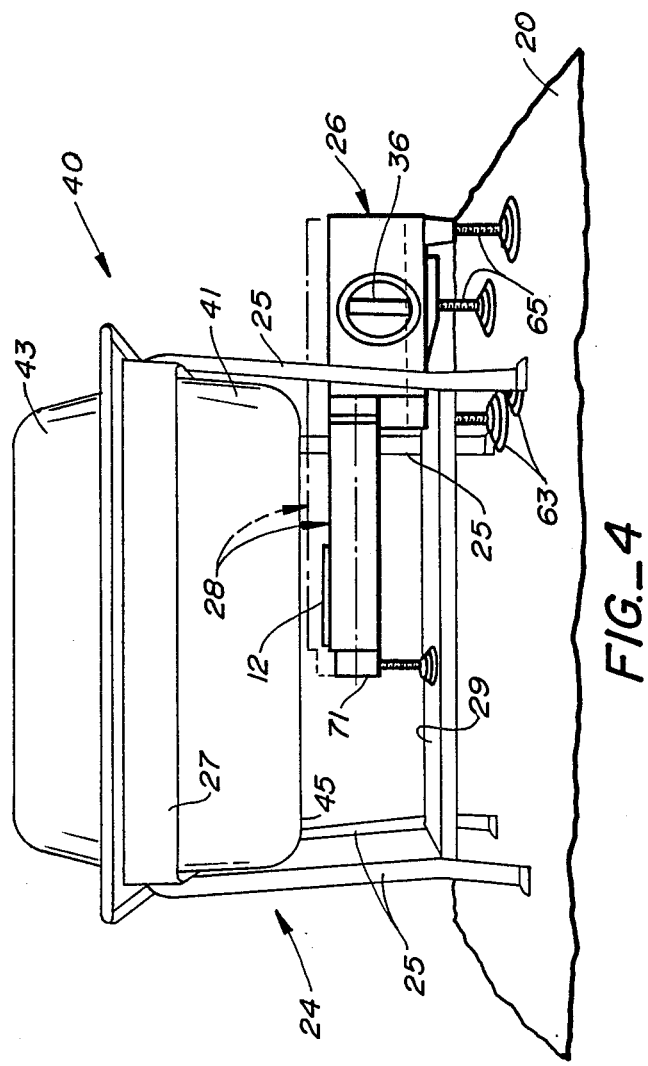

BURNER ASSEMBLY FOR HEATING CHAFING DISHES

TECHNICAL FIELD

The present invention relates, in general, to a food warming and cooking apparatus and, more particularly, relates to chafing dish assemblies which are suitable for cooking or heating food.

BACKGROUND ART

For many years chafing dishes have been in widespread use as a utensil for heating or even cooking a variety of food products. Chafing dishes are often employed as a means of maintaining foods which are cooked in the kitchen at an elevated temperature in the dining room.

Typically chafing dish assemblies have included a dish or tray-like food container, which is metallic, ceramic or glass and a stand or leg structure, which supports the dish or tray above a support surface, such as a table or counter top. Most chafing dishes include a shelf or framework mounted between the legs of the stand parallel to the bottom of the chafing dish which will hold a chafing dish heater. The heater shelf usually supports a wick-based heater which burns a fluid fuel, such as alcohol, or canned chemical in a solid or gel form. The chafing dish heater device is positioned on the shelf at a level and location below the bottom of the chafing dish which will position the flame from the heater unit to warm food contained in the chafing dish.

Wick-based liquid fuel heaters and solid or gel chemical chafing dish heaters have been found to have certain disadvantages. Some of the chafing dish heaters, for example, employ flammable liquids, like alcohol, which can be spilled and present a substantial safety problem. Other heaters may include toxic chemicals or produce uneven flames and suffer from the evaporation of chemicals. Chafing dish heaters, in general, have been constructed n a manner making adjustment of the heat output virtually impossible. Moreover, the shelves used to support such heater units often limit or fix the ability t laterally position or adjust the location of the heater unit with respect to the chafing dish.

Notwithstanding the disadvantages which may exist with prior art chafing dishes, they usually are effective food warming devices and hundreds of thousands, and probably millions, of chafing dishes are currently in use. Since there are generally no standards in the industry, chafing dishes are manufactured in a variety of sizes with a variety of leg and heater shelf configurations. Any attempt to provide an improved system for heating chafing dishes, therefore, is faced with the substantial problem of providing apparatus which is sufficiently universal that it can be used with or retro-fit to a wide range of existing chafing dishes.

Accordingly, it is an object of the present invention to provide an apparatus which is suitable for use in place of a heater unit for a chafing dish assembly, which apparatus is adaptable for use with a wide range of existing chafing dishes.

Another object of the present invention to provide a burner assembly which can be used as a heater unit for heating a chafing dish, or the like, which burner assembly is self-supporting and will accommodate different chafing dish leg configurations or other support structures including heater support shelves.

Another object of the present invention is to provide a burner assembly for heating a chafing dish that is capable of vertical and lateral adjustments relative to the chafing dish and support legs so as to be suitable for use with a wide variety of chafing dishes.

Still a further object of the present invention is to provide a heating assembly for heating a chafing dish which employs butane fuel and an adjustable burner assembly suitable for substantial variation of the heat output to the chafing dish.

A further object of the present invention is to provide a burner assembly for heating a chafing dish which was enhanced safety as compared to standard chafing dish heating units.

Another object of the present invention is to provide a burner assembly for heating a chafing dish in which a user cannot support a cooking vessel directly on the burner head of the assembly, without tipping the assembly over, thereby making the assembly safer by restricting use of the burner assembly to use in combination with a chafing dish having its own leg structure.

It is also an object of the present invention to provide a burner assembly for heating a chafing dish which is inexpensive to construct and which is highly portable.

Still another object of the present invention is to provide a combination chafing dish and burner assembly therefor in which the location of the heat output from the burner assembly can be easily laterally adjusted relative to the chafing dish.

The burner assembly of the present invention has other objects and features of advantage which will become apparent from, or are set forth in more detail in, the accompanying drawings and the following description of the Best Mode of Carrying Out the Invention.

DISCLOSURE OF INVENTION

The present invention is based upon the use of a burner assembly in place of a wick-based liquid or solid chemical heater unit. The burner assembly of the present invention is designed for use with a chafing dish assembly including a chafing dish and a leg structure for support of the chafing dish above a support surface. Usually the leg structure for the chafing dish will include a heater support shelf or framework parallel to and below the chafing dish. The chafing dish burner assembly includes a fuel reservoir or source, a burner head connected to fuel source, a valve mounted between the fuel source and the burner head to control the flow of fuel to the burner head, and burner head support structure supporting the burner head from the support surface. In one aspect of the present invention, the support structure for the burner assembly includes an independently movable base portion formed for positioning at selected locations proximate and outwardly of the leg structure of the chafing dish. The support structure also includes an arm portion which is cantilevered relative to the base portion to extend from a position outwardly of the chafing dish leg structure to a position sufficiently under the chafing dish to enable heating of the chafing dish. The base is formed for support of the arm portion and burner head above the support surface independently of the chafing dish, and usually with the burner head positioned between a heater support shelf and the bottom of the chafing dish. The fuel source of the burner assembly is coupled to the burner head by a conduit of sufficient length to position the fuel source beside or out from under the chafing dish.

In another embodiment of the invention, the burner assembly of the present invention includes a support structure to support the burner head, which support includes an auxiliary support leg that will rest on, but is not fixed to the chafing dish support shelf. The butane burner head and support structure, including the auxiliary leg, are dimensioned for insertion of the burner head from a side of the chafing assembly to a heating position under the chafing dish. The support structure for the burner head, including the auxiliary leg, is independently movable with respect to the chafing dish leg structure.

BRIEF DESCRIPTION OF THE DRAWING

FIG. 1 is a top perspective view of a burner assembly for heating a chafing dish constructed in accordance with the present invention.

FIG. 2 is a top plan view of the butane burner assembly of FIG. 1 showing a portion of the burner housing in an open position.

FIG. 3 is a side perspective view of the burner assembly of FIG. 1 shown placed in a heating position under one end of a chafing dish.

FIG. 4 is an end perspective view of an alternative embodiment of the burner assembly of FIG. 1 shown in a heating position under a side of a chafing dish and having an auxiliary support leg.

BEST MODE OF CARRYING OUT THE INVENTION

In its broadest aspect the present invention is comprised of the use of a burner assembly in place of a conventional heater unit to heat a chafing dish assembly. The burner assembly, preferably a butane burner assembly, has a universal support structure which allows the burner head to be inserted under the chafing dish from a side thereof and moved or laterally adjusted relative to the chafing dish.

As used herein the expression "burner assembly" shall mean a burner having a head of the type suitable to burn and/or vaporized a fuel such as butane, propane, white gas or the like, as distinguished from "heater units" which burn fuel from a wick or directly off of a surface exposed to air. Burner assemblies, of course, are broadly known in connection with the cooking of food products, but they have never been employed to heat or warm a chafing dish.

More particularly, existing burner assemblies, including butane burner assemblies, are extensively found in the camp stove art. These camp stoves, however, are not suitable for use with chafing dishes. This is because these stoves have burner heads which are supported on stands or support structures that would interfere with the legs and/or heater support shelf of a chafing dish. Moreover, if the cook stove stand is removed, the burner head alone is not self-supporting and accordingly, not suitable for use with a chafing dish.

Typical of these prior stove burner assemblies are those disclosed in U.S. Pat. Nos. 4,177,790; 3,978,844; 3,877,458; 3,648,680; 3,884,256; 3,809,054; 3,895,622; 3,933,146; and 4,726,350. These stoves have been directed to the problem of CO heating food in pans which are placed on the stove support stand, and not to the problem of heating chafing dishes having their own independent support stand. The stoves disclosed in these patents also have not dealt with the problem of providing a burner head support which can be adjusted for use with chafing dishes of varying heights and varying leg and heater support tray configurations.

In U.S. Pat. No. 3,978,844 to Wilkens et al., for example, a cooking vessel having an integral gas burner assembly is disclosed in which the burner is integrated into the stand for cooking vessel. While the cooking vessel and the burner head each can be removed from the stand, neither is self-supporting once removed from the stand. Moreover, once both are mounted to the stand, the burner head cannot be moved relative to the cooking vessel. Thus, the gas burner assembly in Wilkens is not adaptable for use as a warming device for chafing dishes.

Referring now to FIGS. 1 and 2, the burner assembly of the present invention, generally designated 8, can be seen to include a fuel source or reservoir 10, a burner head 12 connected by conduit means 14 to fuel source 10, valve means 16 mounted between fuel source 10 and burner head 12 to control the flow of fuel to burner head 12, and burner head support means, generally designated 18, supporting the burner head from a support surface 20. As thus far described, burner assembly 8 of the present invention has elements which are well-known in the cook stove art.

In order to enable heating of chafing dish assemblies having their own support stands or structures, burner assemble 8 of the present invention is formed with a unique support means 18. FIGS. 3 and 4 illustrate a typical chafing dish assembly 40 having a tray-like metallic, glass or ceramic chafing dish 41 which usually, but not always, carries water. A food tray or pan (not shown) is normally nested inside dish 41 and a lid 43 is removably mounted thereon. Supporting dish 41 at a spaced distance above support surface 20 is a chafing dish stand or leg structure, generally designated 24. Leg structure 24 is here shown as including four legs 25, positioned proximate corners of dish 41, which legs are secured to a support collar 27 and a heater support shelf means 29. Dish 41 is slidably mounted in collar 27 and has an upper lip or flange 31 on dish 41, which rests on the top of collar 27.

In the form of heater support shelf means of leg structure 24 shown in the drawing a generally planar plate is provided with two openings 33 and 35 dimensioned to receive a wick-type or open canister-type chafing dish heaters (not shown). Openings 33 and 35 are provided in shelf 29 so as to fix, and thereby make more safe, the chafer heating units. Other forms of frame works or shelves for support of heater units are also conventionally employed, however, such a structure usually reduce the number of locations at which the chafing dish heating units may be placed safely to one or two positions.

In order to accommodate chafing dish leg structure 24, burner assembly 8 is constructed with support means 18 which will allow burner 12 to be inserted under the bottom 45 of dish 41 and over top of shelf means 29 and between legs 25. This may be accomplished by forming burner assembly 8 with a support means 18 comprised of a main body or base 26 and an arm portion 28 cantilever from a side of base 26. The base or body of the burner assembly may be positioned as shown in FIGS. 3 and 4 with virtually all of base 26 proximate but outside the chafing dish leg structure. It is contemplated that a portion of body 26 could be inside the periphery established by legs 25. For example, a base which includes a foot (now shown) that runs under shelf 29 parallel to arm portion 28 could be employed. In such a base construction at least some portion of the base, and usually the majority of base 26, will be outside the leg structure of the chafing dish.

Arm portion 28 of support means 18 is cantilevered relative to base portion 26 to a position sufficiently under chafing dish 40 to enable heating of a significant portion of chafing dish 40. Arm 28 preferably has a relatively small height dimension, h, so as to facilitate easy insertion between shelf means 29 and chafer dish 41. As seen in FIG. 1, h, the height dimension of arm 28 is preferably less than 2 inches and need only accommodate burner head 12 and conduit 14. Similarly arm width, w, is preferably less than 4 inches. Arm 28 is cantilevered or extends outwardly of base 26 by about 6 inches, which will position burner head 12 at about the center of the most commonly used chafing dish assemblies.

Base 26 further is formed for support of arm portion 28 and burner head 12 above support surface 20 for independent lateral movement relative to chafing dish assembly 40. Thus, burner assembly 8 may be positioned as shown in FIG. 3 at either end of chafing dish 40, or as shown in FIG. 4, at a selected position along either side of the chafing dish. This feature allows the heat output from the burner assembly to be most advantageously positioned relative to the food in dish 41, and the location of the burner assembly can be easily adjusted from time-to-time.

As shown in FIG. 2 base 26 is preferably comprised of a frame 51 which supports a housing including stationary panels 53 and a pivotal mounted, L-shaped front panel 55. Front panel 55 is latched by latch assembly 57 in the closed position of FIG. 1 and is pivoted about lower edge 59 to the housing frame. In the open position of FIG. 2, front housing panel 55 swings to a position which allows a fuel reservoir, such as butane canister or container 10, to be inserted into the housing and mounted on needle member 61. Lever 81 will displace container 10 toward needle 61 to seat the canister against the valve assembly. Lever 81 is notched (not shown) to lo hold the same in a down position to keep the reservoir seated against valve assembly 16. Similarly, lever 81 can be raised and butane canister 10 can be easily removed from the base housing.

As will be seen from FIG. 2 fuel reservoir 10 is mounted in base 26 on a side of the base most remote from burner head 12. This structure has two advantages. First, it positions reservoir 10 remotely of bottom 45 of the chafing dish, because conduit 14 and arm 28 have a length sufficient to position 10 outwardly or beside leg structure 24 of the chafing dish. Thus, radiant and convection heating does not reflect back down onto reservoir 10. (Base housing panels 53 and 55 further shield the fuel reservoir from heat transfer.) Second, positioning reservoir 10 on the remote side of base 26 allows the weight of the empty reservoir to be used as a counterweight to cantilevered arm 28.

In order to accommodate a variety of differing chafing dish leg structures, and particularly to accommodate heater support shelves of various heights, base 26 is further preferably provided with vertically adjustable leg means, here a pair of inner legs 63 and a pair of outer legs 65. Vertically adjustable legs 63 and 65 allow displacement of the arm and burner head as shown in phantom in FIG. 4, to change the separation of the burner head from the bottom of the chafing dish and to allow the arm to be cantilevered over the shelf 29.

In the preferred form of the invention fuel source or reservoir 10 and valve means 16, are both mounted to base 26. The combined weight of these elements, with reservoir 10 in an empty condition, plus the weight of base frame 51 and housing panels 53 and 55, acts at a distance from inner base legs 63 which is sufficient to offset the weight of burner head 12 and arm 28. The arm and burner head apply a moment in a counterclockwise direction (FIG. 1) about legs 63, while base 26, including fuel container 10, applies a moment in a clockwise direction. As shown, in FIGS. 1, 3 and 4, therefore, burner assembly 8 is balanced and stable on legs 63 and 65 and therefore is self-supporting with arm 28 spaced above support surface 20.

One of the important advantages of using a burner assembly instead of a heater unit to warm a chafing dish is that burner assemblies can be varied through a much wider range of heat outputs than heater units. Thus, burner assembly 8 can have control means 36 mounted on the exterior of the base housing and coupled to valve means 16 for controlling a quantity of fuel delivered to burner head 12. This allows the chafing dish user to set, and easily adjust or control, the heat output, which is not possible with most heater units.

It is most preferred that burn head 12 be provided as a butane burner head and that canister 10 be filled with butane fuel and gas under pressure. Such butane burner heads and canisters are well known and commercially available for cook stoves. The use of a butane fuel source, however, allows the chafing dish burner assembly to be operated at relatively low pressure. Typical butane operating pressures are 35 lb. per square inch, as contrasted to propane which operates at approximately 160 lb. per square inch. Therefore, the use of butane allows greater heat control of burner head 12 and accordingly, is safer to use than other types of fuel. Butane is also generally less expensive than gelled or liquid alcohol fuels of the type conventionally employed in heater units for chafing dishes.

Cantilevering of arm 28 from base 26 also provides an important safety feature. A user cannot place a cooking utensil not having its own support stand directly on burner head 12, since the weight of the utensil would cause assembly 8 to tip over. Burner assembly 8 of the present invention, therefore, must be used with chafing dishes having their own support stands.

While cantilevering of arm 28 from base 26 is preferred, many of the advantages of the present invention also accrue if arm 28 is provided with an auxiliary support leg 71, as shown in FIG. 4. Auxiliary support leg 71 may be mounted on an end of or under arm 28. Leg 71 is positioned to engage heater support tray 29 and thereby provides additional stability to burner assembly 8.

As will be appreciated, in the form of the invention shown in FIG. 4, the weight of base 26 need not be sufficient to support arm 28, and the arm is no longer supported by cantilevering from the base.

Notwithstanding the partial support of burner assembly 8 from leg structure 24 of the chafing dish and unlike prior cook stove burner assemblies, burner assembly 8, as shown in FIG. 4, is movable independently of and relative to the leg structure and chafing dish. Moreover, auxiliary leg 71 is preferably vertically adjustable to accommodate various shelf heights, and the arm with auxiliary leg 71 can still be inserted into a heating position under the chafing dish from all sides of the chafing dish.

Still further auxiliary leg 71 can be seen to be elevated a substantial distance above surface 20. Thus, if the burner assembly is removed from the chafing dish, leg 71 will not prevent the burner assembly from tipping over if a user tries to place a cooking utensil directly on the burner assembly.

In order to provide additional safety, the burner assembly of the present invention, can include a lever (not shown) which is outwardly biased by a spring into engagement with one of the leg 25 or shelf 29 of chafing dish leg structure 24. The lever would be coupled to valve means 16 to automatically shut off the valve if the lever is not engaged with the chafing dish leg structure.

What is claimed is:

1. In a burner assembly for heating a chafing dish having a leg structure for support of said chafing dish above a support surface, said burner assembly including a fuel source, a burner head connected to said fuel source, valve means mounted between said fuel source and said burner head to control the flow of fuel to said burner head, and burner head support means supporting said burner head from said support surface, wherein the improvement comprises:
    said support means including a base having a base portion formed for positioning on said support surface proximate and outwardly of said leg structure, said support means further including an arm portion cantilevered from a position on said based portion located outwardly of said leg structure and extending from said position outwardly of said leg structure to a heating position sufficiently under said chafing dish for heating of said chafing dish, said base being movable independently of said leg structure and supporting said arm portion and burner head above said support surface independently of said chafing dish; and
    said fuel source being coupled to said burner head by conduit means of sufficient length to position said fuel source beside said chafing dish.

2. The burner assembly for a chafing dish as defined in claim I wherein,
    all of said base is positioned outwardly of said leg structure.

3. The burner assembly for a chafing dish as defined in claim 1 wherein,
    all of said base is positioned outwardly of said leg structure;
    said fuel source is mounted to said base at a location outwardly of said leg structure; and
    said base and said fuel source in an empty condition have a weight relative to the combined weight of said arm portion and said burner head sufficient for cantilevered support of said arm portion and burner head independently of said chafing dish from a location outwardly of said leg structure.

4. The burner assembly for heating a chafing dish as defined in claim 1 wherein,
    said support means includes adjustment means for selective adjustment of the height of the cantilevered arm portion and said burner head relative to said support surface.

5. The burner assembly for heating a chafing dish as defined in claim 4 wherein,
    said adjustment means includes a plurality of adjustable legs mounted beneath said base and formed to enable adjustment of the height of said base to simultaneously effect adjustment of the height of said arm portion and said burner head as a unit.

6. A burner assembly for use in heating a chafing dish assembly having a chafing dish, and a leg structure supporting said chafing dish from a support surface, said leg structure including shelf means extending parallel and in spaced relation to said chafing dish, said burner assembly comprising:
    a fuel container having butane fuel under pressure stored therein;
    a butane burner head;
    conduit means connecting said fuel container to said burner head;
    valve means coupled to said conduit means and controlling the flow of butane from said fuel container to said burner head;
    support means supporting said burner head;
    the combination of said burner head and said support means being dimensioned for insertion of said burner head from a position outside said leg structure to a heating position sufficiently inwardly of said leg structure and under said chafing dish and over said shelf means to permit heating of said chafing dish;
    said support means supporting said burner head for lateral movement relative to said leg structure when said burner head is in said heating position;
    said fuel container being positioned sufficiently remote of said burner head to be substantially out from under said chafing dish when said burner head is in said heating position and
    said support means includes a base having a portion formed for positioning proximate and outwardly of said leg structure, said fuel container being mounted to said base portion, said support means further including an arm portion cantilevered relative to said portion of said base to extend from a position outwardly of said leg structure to said heating position under said chafing dish, and said base being movable with respect to said leg structure and supporting said arm portion and burner head above said support surface from a side and independently of said chafing dish assembly.

7. The burner assembly as defined in claim 6 wherein,
    said base and said fuel source in an empty condition have a weight relative to the combined weight of said arm portion and said burner head sufficient for cantilevered support of said arm portion and said burner head independently of and under said chafing dish for heating of said chafing dish.

8. A food warming assembly comprising:
    (a) a chafing dish assembly including a chafing dish, and a leg structure supporting said chafing dish over a support surface, said leg structure having shelf means extending parallel to and spaced below said chafing dish for support of a chafing dish heater under said chafing dish; and
    (b) a burner assembly including a base positioned on said support surface proximate said chafing dish and entirely outwardly of said leg structure, an arm mounted to said base, a burner head mounted on said arm, said burner head being dimensioned for insertion from a side of said leg structure to a heating position at a location under said chafing dish and between said shelf means and said chafing dish, said arm extending outwardly from said burner head and coupled to said base at a position outwardly of said leg structure and proximate a side of said chafing dish, said arm and said burner head being laterally movable with respect to said chafing dish and said shelf means to permit independent lateral adjustment of the location of said heating position, a fuel reservoir positioned outwardly of said leg structure, and means connecting said fuel reservoir to said burner head for the controlled flow of fuel to said burner head.

9. A burner assembly for use in heating a chafing dish assembly having a chafing dish, and a leg structure supporting said chafing dish from a support surface, said leg structure including shelf means extending parallel and in spaced relation to said chafing dish, said burner assembly comprising a fuel container, a burner head, conduit means connecting said fuel container to said burner head, valve means coupled to said conduit means and controlling the flow of fuel from said fuel container to said burner head, support means supporting said burner head, the combination of said burner head and said support means being dimensioned for insertion of said burner head from a position outside said leg structure to a heating position sufficiently inwardly of said leg structure and under said chafing dish and over said shelf means to permit heating of said chafing dish, said support means supporting said burner head for lateral movement relative to said leg structure when said burner head is in said heating position, and said fuel container being positioned sufficiently remote of said burner head to be substantially out from under said chafing dish when said burner head is in said heating position, said support means including vertically adjustable auxiliary leg means proximate said burner head to engage said shelf means inwardly of said leg structure.

* * * * *

UNITED STATES PATENT AND TRADEMARK OFFICE
CERTIFICATE OF CORRECTION

PATENT NO. : 4,899,722
DATED : February 13, 1990
INVENTOR(S) : Richard L. Horewitch It is certified that error appears in the above-identified patent and that said Letters Patent is hereby corrected as shown below:

COLUMN 1, line 44, delete "t" and insert ---to---;

COLUMN 3, line 63, delete "CO"; and

COLUMN 5, line 41, after "to" and before "hold", delete "lo".

Signed and Sealed this

Eighth Day of January, 1991

Attest:

HARRY F. MANBECK, JR.

Attesting Officer

Commissioner of Patents and Trademarks